United States Patent
Lakkakorpi

(10) Patent No.: US 7,489,632 B2
(45) Date of Patent: Feb. 10, 2009

(54) SIMPLE ADMISSION CONTROL FOR IP BASED NETWORKS

(75) Inventor: Jani Lakkakorpi, Helsinki (FI)

(73) Assignee: Nokia Corporation, Espoo (FI)

( * ) Notice: Subject to any disclaimer, the term of this patent is extended or adjusted under 35 U.S.C. 154(b) by 734 days.

(21) Appl. No.: 10/105,067

(22) Filed: Mar. 22, 2002

(65) Prior Publication Data

US 2003/0179704 A1 Sep. 25, 2003

(51) Int. Cl.
H04J 1/16 (2006.01)
H04L 1/00 (2006.01)

(52) U.S. Cl. ........................ 370/231; 370/229; 370/230; 370/230.1; 370/232; 370/233; 370/236.1; 370/236.2; 370/237; 370/235.1; 370/252; 370/253; 370/395.2; 370/395.21; 370/395.4; 370/395.41; 370/326; 370/328; 370/331; 370/465; 370/468; 709/229; 709/232; 455/436; 455/439; 455/452.1

(58) Field of Classification Search .................. None
See application file for complete search history.

(56) References Cited

U.S. PATENT DOCUMENTS

| 6,633,585 | B1 * | 10/2003 | Ghanwani et al. | ........... 370/468 |
| 2001/0032262 | A1 | 10/2001 | Sundqvist et al. | |
| 2002/0004379 | A1 * | 1/2002 | Gruhl et al. | ................. 455/403 |
| 2002/0029258 | A1 * | 3/2002 | Mousseau et al. | ........... 709/218 |
| 2002/0181394 | A1 * | 12/2002 | Partain et al. | ............... 370/229 |

FOREIGN PATENT DOCUMENTS

| EP | 1056246 | 11/2000 |
| WO | WO 00/30295 | 5/2000 |
| WO | WO 01/89234 | 11/2001 |
| WO | WO 02/01797 | 1/2002 |

OTHER PUBLICATIONS

K. Nichols et al, "A Two-bit Differentiated Services Architecture for the Internet", *Request For Comments 2638*, pp. 1-25, Jul. 1999.
R. Neilson et al., "A Discussion of Bandwidth Broker Requirements for Internet2 Qbone Deployment", *Internet2 Qbone BB Advisory Counsil*, Version 7, pp. 1-30, Aug. 1999.
O. Schelén, "Quality of Service Agents in the Internet", *Ph.D. thesis, Division of Computer Communication, Department of Computer Science and Electrical Engineering, Luleá University of Technology*, Aug. 1998.

(Continued)

*Primary Examiner*—Chi H Pham
*Assistant Examiner*—Raj K Jain
(74) *Attorney, Agent, or Firm*—Harrington & Smith, PC

(57) ABSTRACT

A simple admission control mechanism for IP based networks is provided. The decision on whether a new flow is accepted is based on the link load information on the paths from the source to destination. The new flow is accepted when the link load is less than a threshold. When at least one of the links on all of the available paths is larger than the acceptable threshold, access is denied to the flow. More than one threshold level may be used. Under the multiple threshold scenario, the traffic may be divided into different classes. The admission control mechanism helps to ensure a network that is not heavily congested.

31 Claims, 7 Drawing Sheets

OTHER PUBLICATIONS

O. Schelén et al., "Resource Reservation Agents in the Internet", *Proceedings of 8th International Workshop on Network and Operating Systems Support for Digital Audio and Video (NOSSDAV'98)*, Cambridge, UK, Jul. 1998.

O. Schelén et al. "Aggregating Resource Reservations over Multiple Routing Domains", *Proceedings of IFIP Sixth International Workshop on Quality of Service (IWQoS'98)*, Napa Valley, California, May 1998.

O. Schelén et al, "Performance of QoS Agents for Provisioning Network Resources", *Proceedings of IFIP Seventh International Workshop on Quality of Service (IWQOS'99)*, London, UK, Jun. 1999.

John T. Moy, "OSPF: Anatomy of an Internet Routing Protocol", (3rd Edition, Addison Wesley Longman, Inc., Sep. 1998), pp. 1-339.

Xiao, X., et al. (1999) "Internet QoS: A Big Picture," IEEE Network, 13:2, pp. 8-18.

Detti, A. et al. (1999) "Supporting RSVP in a Differentiated Service Domain: an Architectural Framework and Scalabillty Analysis," IEEE International Conference on Communications, vol. 1., pp. 204-210.

European Search Report dated Jul. 13, 2006 in related European Application No. 06076050.1.

* cited by examiner $$\text{link load}_i = (1-w)*\text{link load}_{i-1} + w*(8*\text{bytes per period}_i/(p*\text{link capacity}))$$

*w* = weighting parameter

*p* = measurement period parameter

SIMPLE ADMISSION CONTROL FOR IP BASED NETWORKS

FIELD OF THE INVENTION

The present invention relates to IP networks, and more particularly to an admission control mechanism for IP networks.

BACKGROUND OF THE INVENTION

The development of mobile communication devices and mobile networks has advanced at a rapid rate. At first, analog mobile networks enabled voice communication and simple paging features. Later, digital mobile networks provided more advanced features for voice and data communication, such as encryption, caller identification and short message service (SMS) text messages. More recently, third generation (3G) mobile IP network technology is being developed to enable users to easily access content rich media, information and entertainment with mobile devices.

As mobile devices and mobile networks have advanced, and more data has become available to the users, the demand on the networks has continued to increase. The increase in demand can cause a network to become heavily congested.

One way that has been used to attempt to alleviate congestion on a network is to add more bandwidth. This approach, however, has many drawbacks. Adding more bandwidth is expensive and does not ensure that a network will not become congested. Eventually, all of the available bandwidth will be utilized from the increased demand.

What is needed is a way to simply determine when a new flow should be accepted into the network in order to avoid congestion. It is with respect to these considerations and others that the present invention has been made.

SUMMARY OF THE INVENTION

The present invention is directed at addressing the above-mentioned shortcomings, disadvantages and problems, and will be understood by reading and studying the following specification.

According to one aspect of the invention, a simple admission control mechanism is directed at determining when a new flow is accepted into an IP based network.

According to yet another aspect of the invention, the decision whether to accept a new flow is based on the path congestion for the available paths from the source of the new flow to the destination of the new flow. Each link load within the paths is calculated to determine path congestion. The link load may be real time load for real time traffic, total load for other traffic, and the like. The link load may be any subset of the total load that is based on the number of bytes dequeued from certain DiffServ router output queues for any traffic class. For example, real time load for Expedited Forwarding (EF) traffic, which is mapped to highest priority queue, may be considered to be congested when the threshold is larger than 0.8*link bandwidth. Other traffic thresholds may be set at higher thresholds, e.g. threshold=0.95*link bandwidth.

When all of the paths are congested, the new flow is not accepted. When at least one of the paths is not congested, the new flow is accepted.

According to yet another aspect of the invention, the link load is determined by an exponential averaging equation. A configurable weighting factor may be set depending on how fast the operator desires to react to changes in link loads at each node within the network. A measurement period factor may be set for the period the link load is measured.

According to still yet another aspect of the invention, the new flow is accepted when the link load is below a predetermined threshold. Several different thresholds may be configured. For example, a different threshold may be used for different classes of service.

According to a further aspect of the invention, the link loads may be monitored by a dedicated network element, such as a bandwidth broker, or by individual network nodes, such as routers.

DETAILED DESCRIPTION OF THE PREFERRED EMBODIMENT

Figure 1:
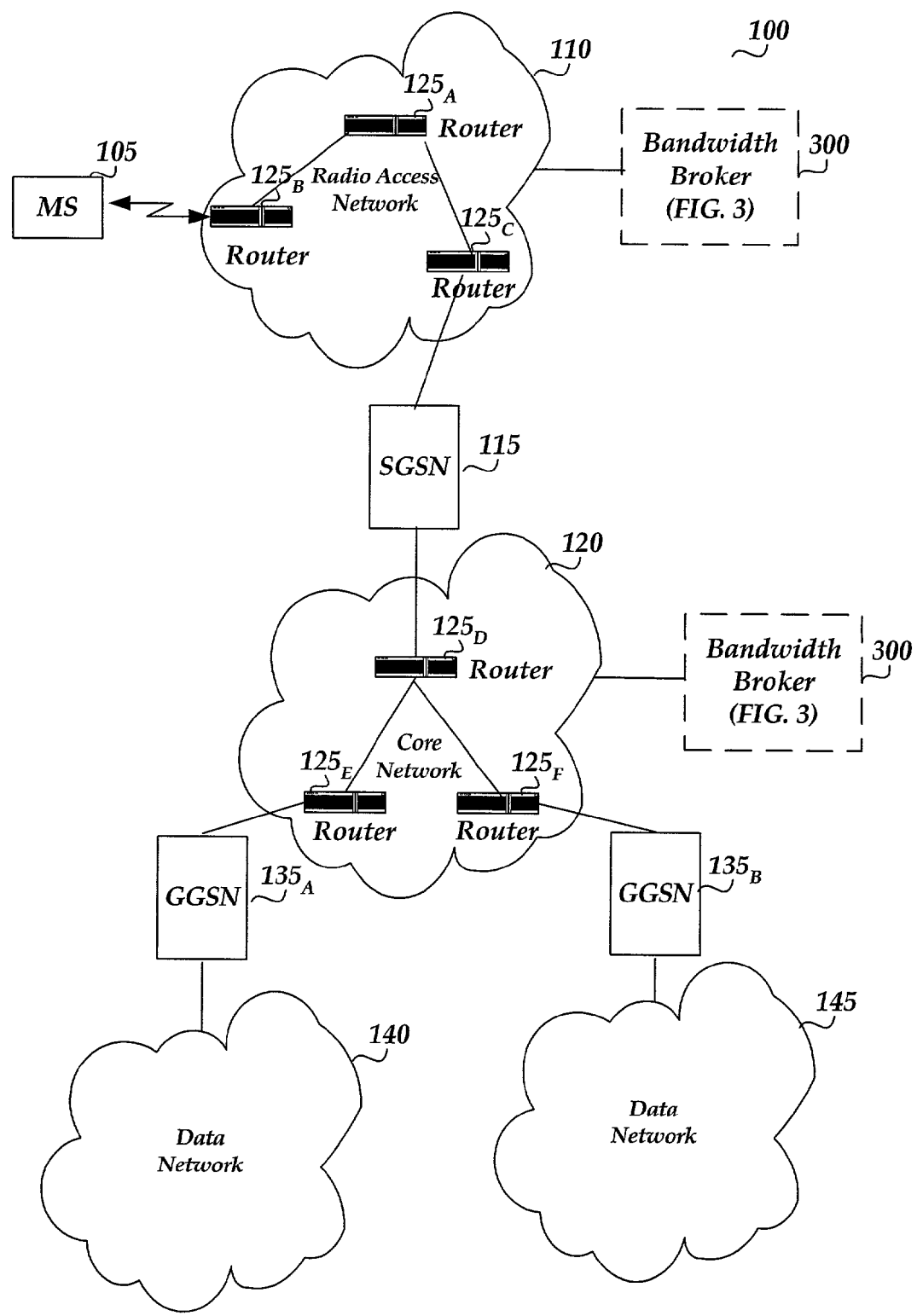
FIG. 1 illustrates an exemplary mobile IP network in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "node" refers to a network element, such as a router, that monitors a load for a link within a path. The term "link load" refers to the load associated with the node. The term "bandwidth broker" refers to a dedicated network element that knows the topology and link loads associated with the network. The term "flow" means a flow of packets. The term support node refers to both "GGSN" and "SGSN" nodes. The term "user" refers to any person or customer such as a business or organization that employs a mobile device to communicate or access resources over a mobile network. The term "operator" refers to any technician or organization that maintains or services an IP based network. The term "identifier" includes an MSISDN number, an IP address, or any other information that relates to the location or identity of the user. Referring to the drawings, like numbers indicate like parts throughout the views. Additionally, a reference to the singular includes a reference to the plural unless otherwise stated or is inconsistent with the disclosure herein.

Illustrative Operating Environment

With reference to FIG. 1, an exemplary mobile IP network in which the invention may operate is illustrated. As shown in the figure, mobile IP network 100 includes mobile station (MS) 105, radio access network (RAN) 110, SGSN 115, core network 120, routers $125_{A-F}$, optional bandwidth broker (BB) 300, GGSNs $135_{A-B}$, data network 140, and data network 145.

The connections and operation for mobile IP network 100 will now be described. MS 105 is coupled to radio access network (RAN) 110. Generally, MS 105 may include any device capable of connecting to a wireless network such as radio access network 110. Such devices include cellular telephones, smart phones, pagers, radio frequency (RF) devices, infrared (IR) devices, integrated devices combining one or more of the preceding devices, and the like. MS 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Radio Access Network (RAN) 110 manages the radio resources and provides the user with a mechanism to access core network 120. Radio access network 110 transports information to and from devices capable of wireless communication, such as MS 105. Radio access network 110 may include both wireless and wired components. For example, radio access network 110 may include a cellular tower that is linked to a wired telephone network. Typically, the cellular tower carries communication to and from cell phones, pagers, and other wireless devices, and the wired telephone network carries communication to regular phones, long-distance communication links, and the like. As shown in the figure, RAN 110 includes routers $125_{A-C}$. According to one embodiment of the invention, routers $125_{A-C}$ may calculate their own link loads as well as process link loads relating to other nodes on the network. The routers may send a warning message to other routers within the network when its link load exceeds a configurable threshold. When there is at least one link load within each available path from a source to a destination for a new flow that is above the configurable threshold, the new flow attempting to enter the network is rejected. Alternatively, a bandwidth broker, or some other dedicated network element, may be used to process information relating to the link loads of the nodes within the network. Briefly described, BB 300 may be used to monitor and aid in carrying out the simple admission control for IP based networks. According to this particular embodiment, each router informs BB 300 of its link load and receives information relating to the link loads for the other nodes within the network.

Some nodes may be General Packet Radio Service (GPRS) nodes. For example, Serving GPRS Support Node (SGSN) 115 may send and receive data from mobile stations, such as MS 105, over RAN 110. SGSN 115 also maintains location information relating to MS 105. SGSN 115 communicates between MS 105 and Gateway GPRS Support Node (GGSN)s $135_{A-B}$ through core network 120. According to one embodiment of the invention, BB 300 communicates with RAN 110 and core network 120.

Core network 120 is an IP packet based backbone network that includes routers, such as routers $125_{D-F}$, to connect the support nodes in the network. Routers are intermediary devices on a communications network that expedite message delivery. On a single network linking many computers through a mesh of possible connections, a router receives transmitted messages and forwards them to their correct destinations over available routes. Routers may be a simple computing device or a complex computing device. For example, a router may be a computer including memory, processors, and network interface units.

GGSNs $135_{A-B}$ are coupled to core network 120 through routers $125_{A-C}$ and act as wireless gateways to data networks, such as network 140 and network 145. Networks 140 and 145 may be the public Internet or a private data network. GGSNs $135_{A-B}$ allow MS 105 to access network 140 and network 145.

Bandwidth broker (BB) 300 is coupled to RAN 110 and core network 120 through communication mediums. BB 300 may be programmed by an operator with instructions to manage the admission control of new flows for mobile IP network 100. More specifically, the operator may generate configurable thresholds and rules to help ensure a network free from congestion. BB 300 may receive link loads from the routers within the network, and in response to the received link loads, generate and send information relating to the link loads for the nodes on the network to the routers. For example, the information may be the link loads for all of the other routers within the network. The information may also be configuration rules for the routers. BB 300 is an optional element. The nodes within the network may be used to carry out the simple admission control mechanism.

The operator may set threshold levels to determine whether or not to accept a new flow based on different service classes for a particular user or group of users. As mentioned above, the routers, or a dedicated network element, such as BB 300, may be used for this purpose. For example, conversational traffic from user group A may be carried with an Expedited Forwarding (EF) class would have one threshold level, whereas conversational traffic from user group B carried with an Assured Forwarding (AF) class would have a different service level. The specific user of MS 105 may be differentiated into one of these user groups by the user Mobile Station Integrated Services Digital Network (MSISDN) number that is known to both the SGSN and the GGSN support nodes.

Furthermore, computers, and other related electronic devices may be connected to network 140 and network 145. The public Internet itself may be formed from a vast number of such interconnected networks, computers, and routers. Mobile IP network 100 may include many more components than those shown in FIG. 1. However, the components shown are sufficient to disclose an illustrative embodiment for practicing the present invention.

The media used to transmit information in the communication links as described above illustrate one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
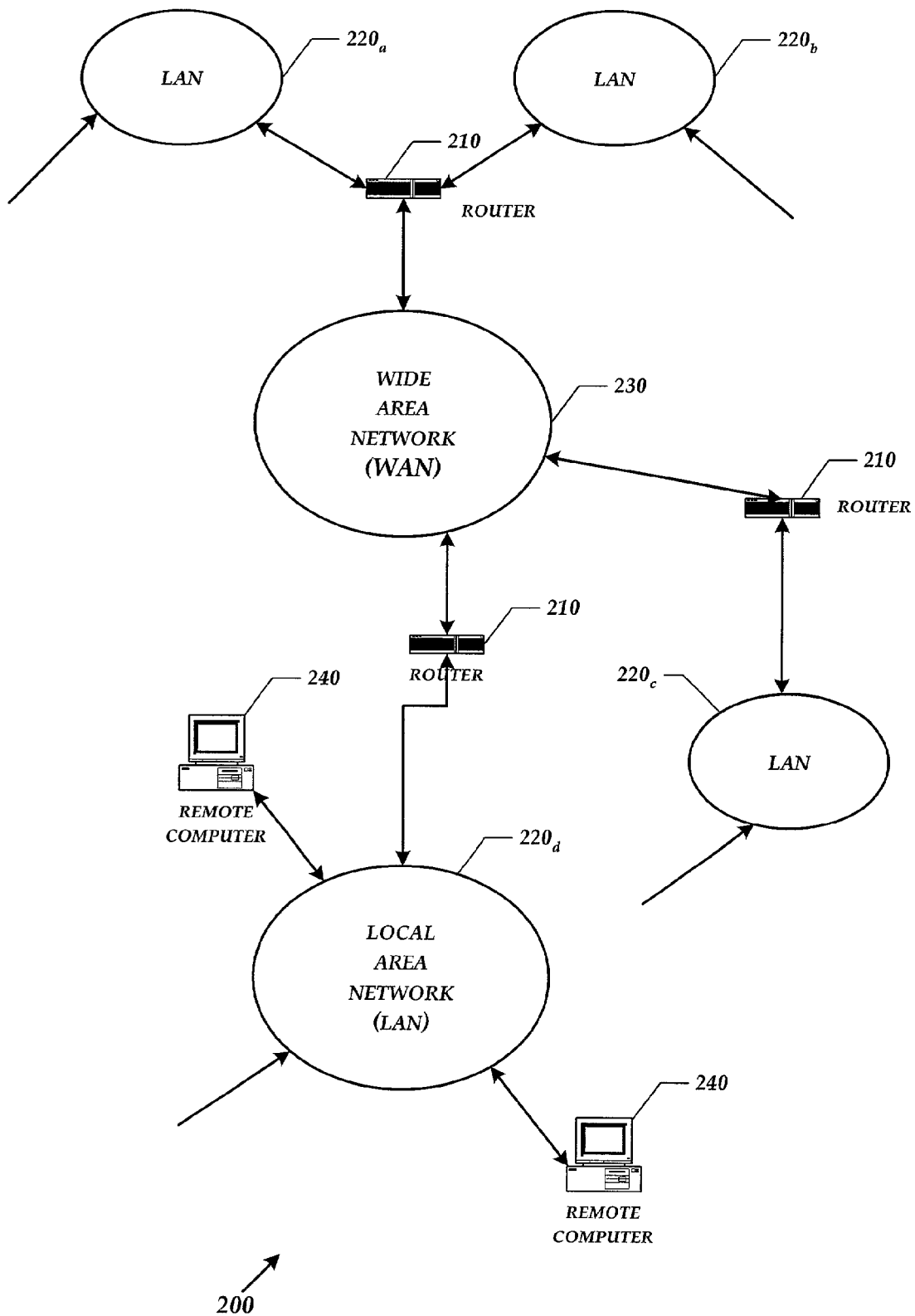
FIG. 2 shows a schematic diagram that illustrates an exemplary system overview in which local area networks and a wide area network are interconnected by routers.

FIG. 2 shows another exemplary system in which the invention operates in which a number of local area networks ("LANs") $220_{a-d}$ and wide area network ("WAN") 230 interconnected by routers 210. On an interconnected set of LANs—including those based on differing architectures and protocols—, a router acts as a link between LANs, enabling messages to be sent from one to another.

Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links. Furthermore, computers, such as remote computer 240, and other related electronic devices can be remotely connected to either LANs $220_{a-d}$ or WAN 230 via a modem and temporary telephone link. The number of WANs, LANs, and routers in FIG. 2 may be increased or decreased without departing from the spirit or scope of this invention. As such, the Internet itself may be formed from a vast number of such interconnected networks, computers, and routers and that an embodiment of the invention could be practiced over the Internet without departing from the spirit and scope of the invention.

Figure 3:
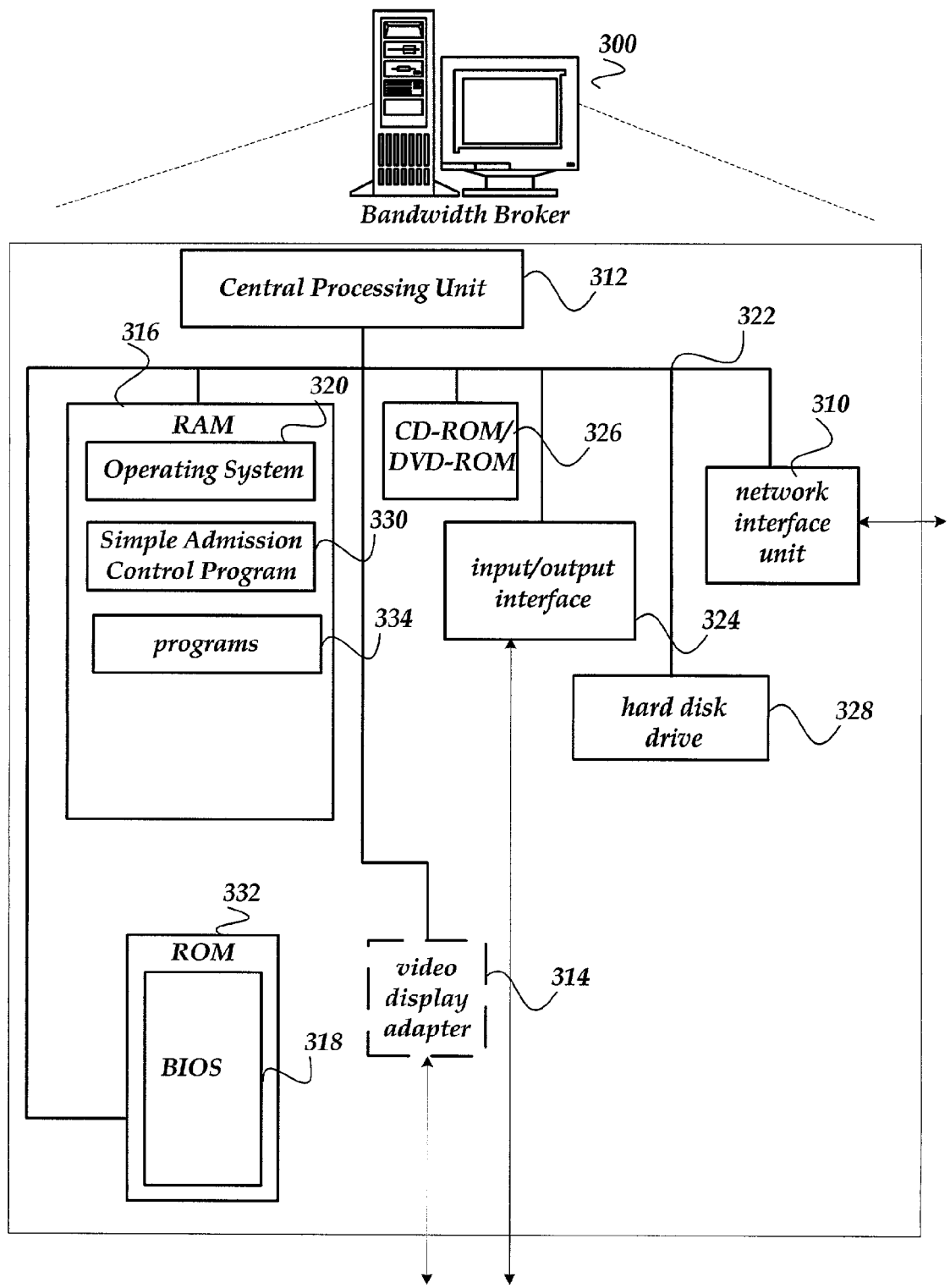
FIG. 3 is a schematic diagram that shows an exemplary bandwidth broker that is operative to process information relating to the link loads on the network.

FIG. 3 is a schematic diagram that shows an exemplary bandwidth broker that is operative to process information relating to the link loads on the network. Accordingly, BB 300 may receive and transmit data relating to the simple admission control mechanism. For instance, BB 300 may transmit link load data and receive link load data from the components on the IP network.

BB 300 may include many more components than those shown in FIG. 3. However, the components shown are sufficient to disclose an illustrative embodiment for practicing the present invention. As shown in FIG. 3, BB 300 is connected to RAN 110 and core network 120, or other communications network, via network interface unit 310. Network interface unit 310 includes the necessary circuitry for connecting BB 300 to core network 120, and is constructed for use with various communication protocols including the COPS protocol that runs on top of TCP. Other communications protocols may be used, including, for example, UDP protocols. Typically, network interface unit 310 is a card contained within BB 300.

BB 300 also includes processing unit 312, optional video display adapter 314, and a mass memory, all connected via bus 322. The mass memory generally includes RAM 316, ROM 332, and one or more permanent mass storage devices, such as hard disk drive 328, a tape drive, CD-ROM/DVD-ROM drive 326, and/or a floppy disk drive. The mass memory stores operating system 320 for controlling the operation of BB 300. This component may comprise a general purpose operating system 320 as is known to those of ordinary skill in the art, such as UNIX, LINUX™, or Microsoft WINDOWS NT®. Basic input/output system ("BIOS") 318 is also provided for controlling the low-level operation of BB 300.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for simple admission control program 330 (See Figures and Related discussion below), and programs 334. Simple admission control program 330 includes computer executable instructions which, when executed by BB 300, help in executing the simple admission control mechanism across the IP based network. BB 300 may include a JAVA virtual machine, an HTTP handler application for receiving and handing HTTP requests, JAVA applets for transmission to a WWW browser executing on a client computer, an IPsec handler, a Transport Layer Security (TLS) handler and an HTTPS handler application for handling secure connections. Either the IPsec handler or the TLS handler may be used to provide security protection for the COPS protocol. HTTPS handler application may be used for communication with external security applications (not shown), to send and receive private information in a secure fashion.

BB 300 may also comprise an input/output interface 324 for communicating with external devices, such as a mouse, keyboard, scanner, or other input devices not shown in FIG. 3. Likewise, BB 300 may further comprise additional mass storage facilities such as CD-ROM/DVD-ROM drive 326 and hard disk drive 328. Hard disk drive 328 is utilized by BB 300 to store, among other things, application programs, databases, and program data used by simple admission control program 330. For example, link loads, topology of the network, user databases, relational databases, and the like, may be stored.

Simple Admission Control for IP Based Networks

Figure 4:
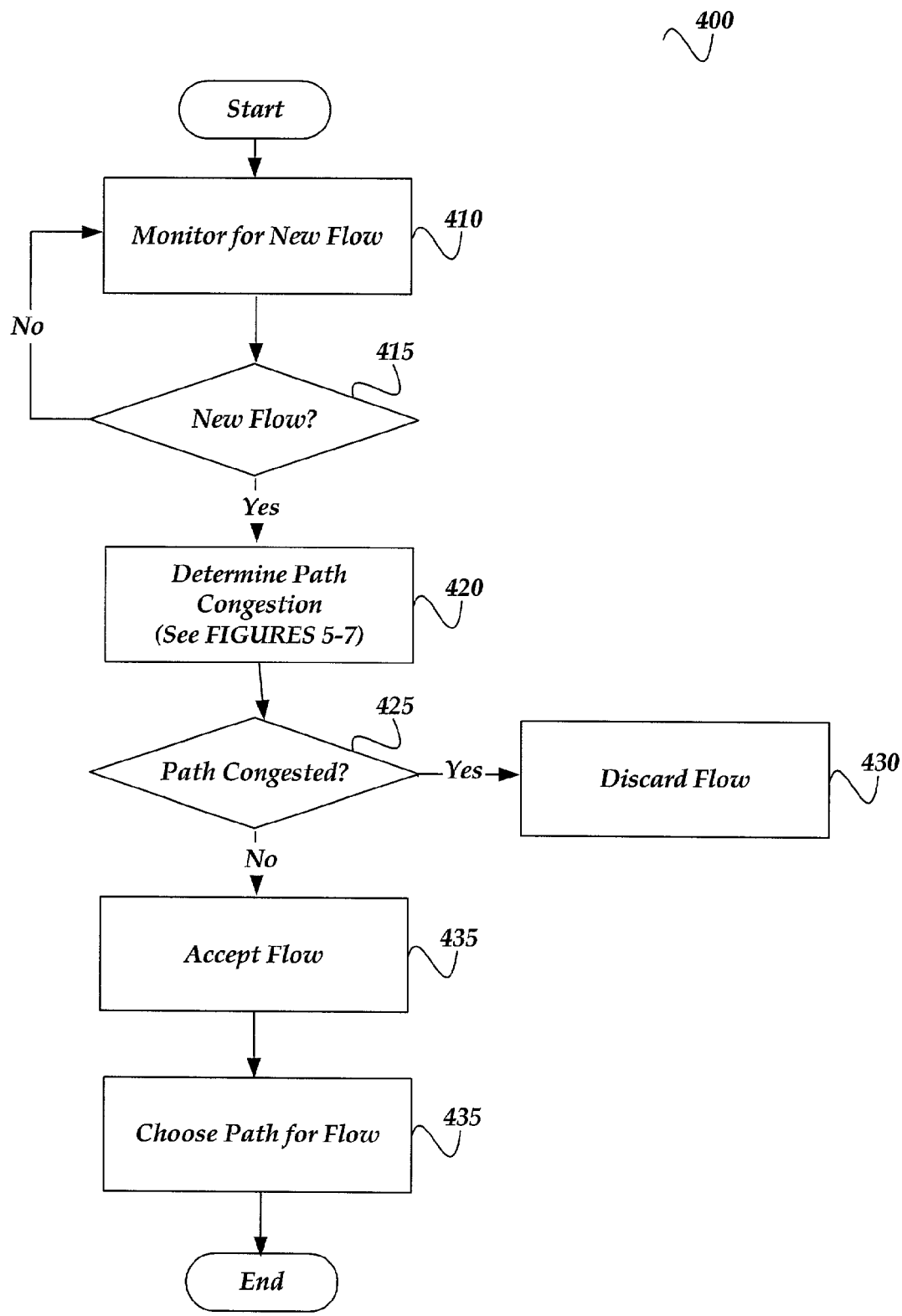
FIG. 4 illustrates an overview of a simple admission control process.

FIG. 4 illustrates an overview of a simple admission control process 400, in accordance with aspects of the invention. After a start block, the process moves to block 410 at which point the process monitors for new flows attempting to enter the network. Transitioning to decision block 415, a determination is made as to whether a new flow has arrived. When there is not a new flow, the process returns to block 410 to continue monitoring for new flows. When there is a new flow, the process moves to block 420 at which point the congestion of the path is determined. According to one embodiment of the invention, the link congestion for all of the possible paths from the source to destination of the flow is determined. For each path from the source to destination, a link load for each link within the path is calculated. A link is congested when the link load is larger than a configurable threshold. For example, the link may be congested when the link load is larger than a threshold of 90%. Other thresholds may be chosen. Stepping to decision block 425, a decision is made as to whether all of the paths the flow may use are congested. When all of the paths are congested, the process steps to block 430 where the new flow is discarded. In other words, the new flow is not accepted by the IP based network. When at least one of the paths is not congested, the process steps to block 435, at which point the new flow is accepted. Transitioning to block 440, the process chooses the path for the new flow. According to one embodiment of the invention, the least congested path is chosen. The path may be chosen using some other method. For example, the path may be chosen on number of hops, shortest distance, or some other parameter. The path may also be chosen based on a class of service. The process then advances to an end block and returns to processing other actions.

Figure 5:
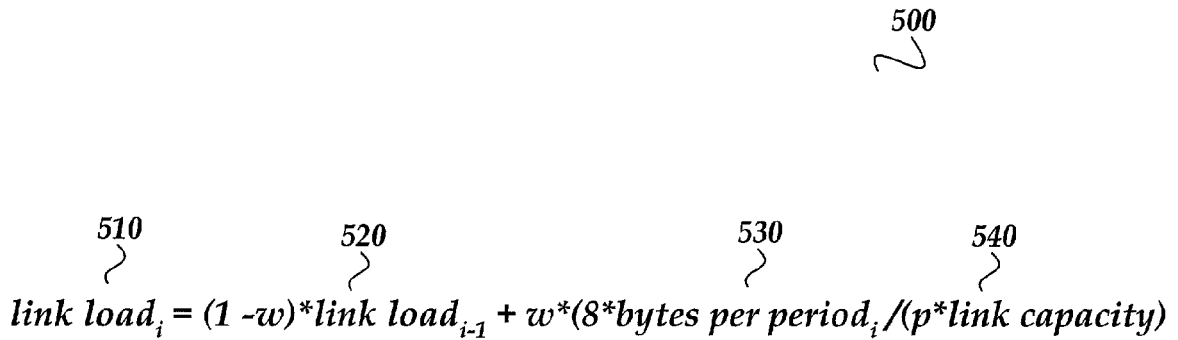
FIG. 5 shows an exemplary equation for representing link load.

FIG. 5 shows an exemplary equation for representing link load. The equation:

$$\text{link load}_i = (1-w)*\text{link load}_{i-1} + w*(8*\text{bytes per period}_i/(p*\text{link capacity}))$$

is used to calculate link load 510 according to one embodiment of the invention. Weighting parameter "w" 520 is configurable, and according to one embodiment of the invention, is set at 0.5. Weighting parameter "w" 520 relates to how much weight previous link load values are given in the equation. In other words, weighting parameter "w" 520 is set depending on how fast the operator desires the link load value to react to the changes in link loads. Measurement period parameter "p" 530 is the period of time the load for the node is measured. According to one embodiment of the invention, measurement period parameter "p" 530 is 500 milliseconds. Other measurement period parameters may be used. Link capacity 540 is the capacity of the particular link being measured. According to one embodiment of the invention, link capacity is measured in bits per second (bps).

The link load may be real time load for real time traffic, total load for other traffic, and the like. The link load may be any subset of the total load that is based on the number of bytes dequeued from certain DiffServ router output queues for any traffic class. For example, real time load for Expedited Forwarding (EF) traffic, which is mapped to highest priority queue, may be considered to be congested when the real time load is larger than real time threshold (e.g., 0.8*link bandwidth). Other traffic thresholds may be set at higher thresholds, e.g. total threshold=0.95*link bandwidth.

Figure 6:
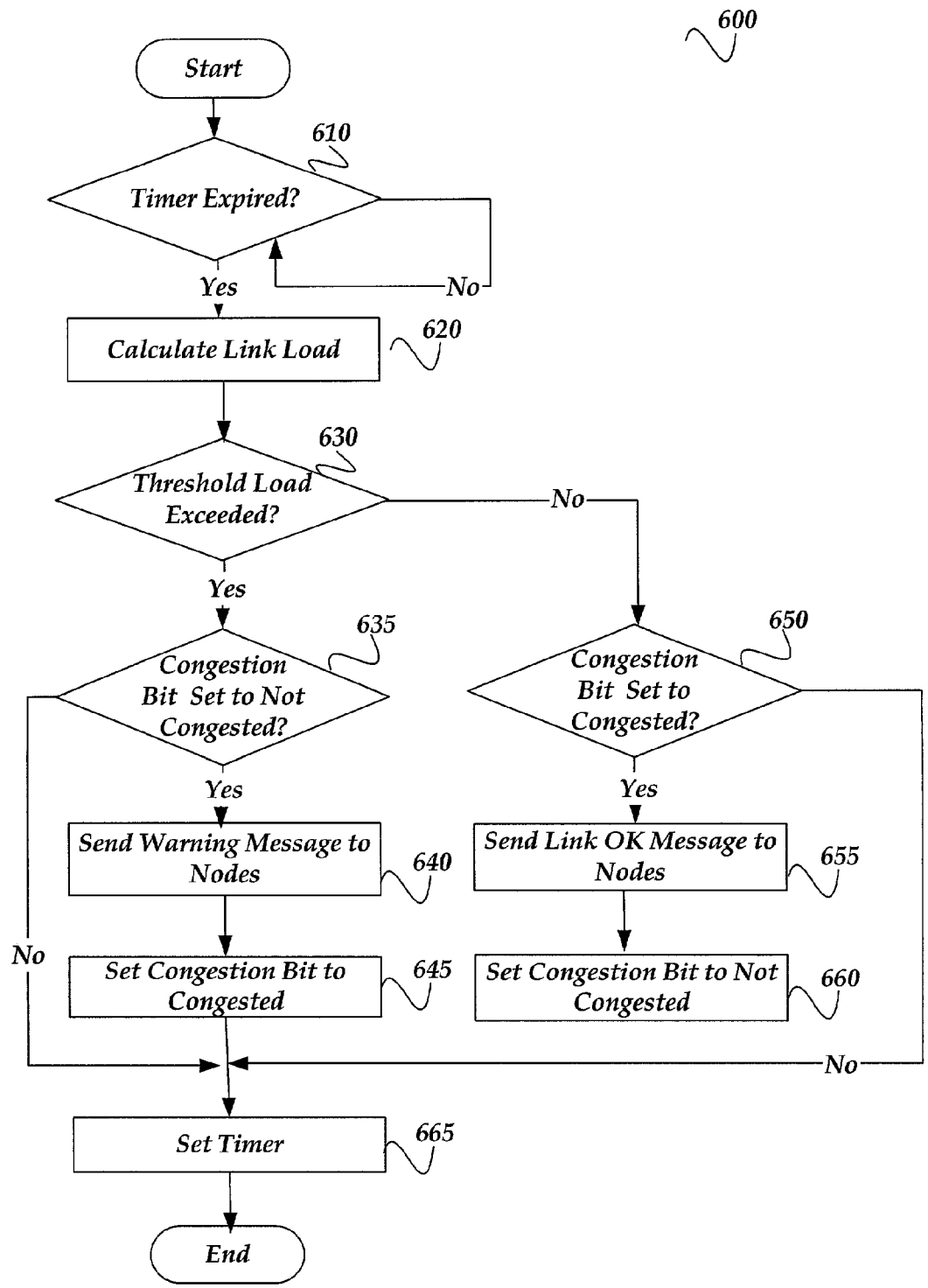
FIG. 6 shows a process for a simple admission mechanism for an IP based network.

FIG. 6 shows a process for a simple admission mechanism 600 for an IP based network. After a start block, the process moves to decision block 610 where a determination is made as to whether a timer has expired. According to one embodiment of the invention, the link load for each node is calculated at predetermined periods. For example, the timer may be set at 500 milliseconds. When the timer has not expired, the process waits for the timer to expire. When the timer has expired, the process moves to block 620 at which point the link load is calculated. According to one embodiment of the invention, the link load is calculated using the exponential averaging equation illustrated in FIG. 5.

Transitioning to decision block 630, a determination is made as to whether the link load exceeds a predetermined threshold. The link and any path that the link is within is congested when the link load is above the predetermined threshold. The predetermined threshold may be set to many different values. For instance, the threshold may be set at 90% of link capacity. Additionally, more than one threshold may be used to determine when a link is congested. For example, a different threshold may be chosen for each different service class. When the threshold is exceeded, the process steps to decision block 635, at which point a determination is made as to whether a congestion bit is set to indicate that the link is not congested. According to one embodiment of the invention, a bit within the node is set to a value of one when the link is congested and is set to zero when the link is not congested.

Figure 7:
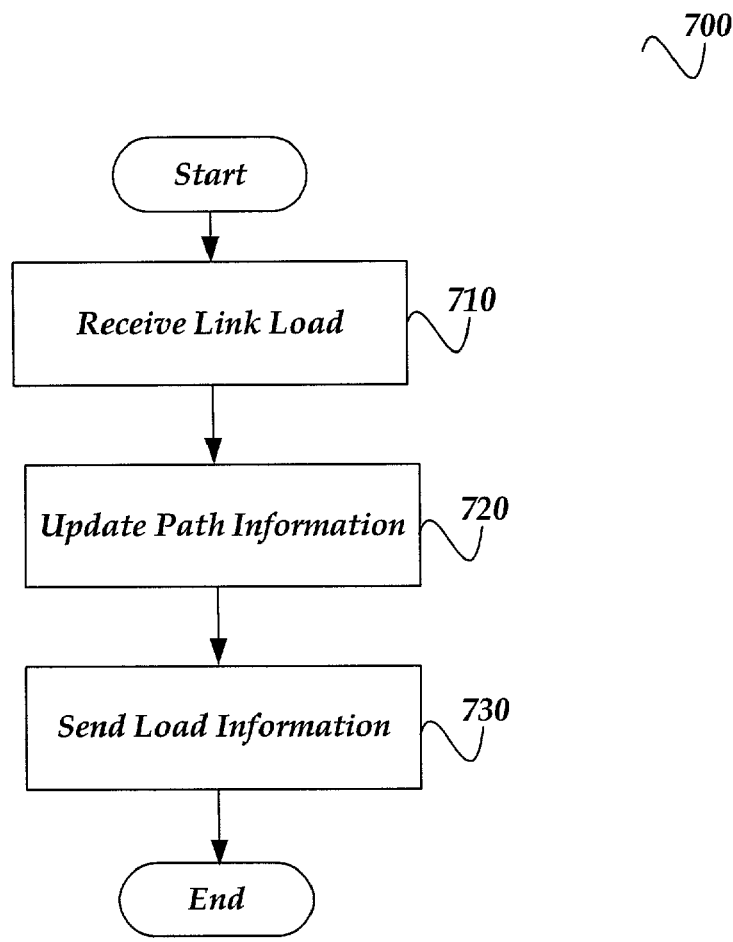
FIG. 7 illustrates a simple admission control utilizing a dedicated network element, in accordance with aspects of the invention.

According to another embodiment of the invention, a dedicated network element, such as a bandwidth broker, may maintain the congestion states of the links (See FIG. 7 and related discussion). Other indicators may be used to represent that a link is congested. At block 635, when the congestion bit is set to not congested, the process transitions to block 640 where a warning message is sent to the other nodes within the network indicating that a particular link is congested. Stepping to block 645, the process sets the congestion bit within the node to indicate that its link is congested. Stepping to block 665, the timer is set. When the congestion bit has already been set to congested, the process moves to block 665 to set the timer. The nodes do not need to be informed that the link is congested when the congestion bit was previously set, as all nodes have already been notified that the link is congested.

When the threshold load has not been exceeded the process steps to decision block 650 where a determination is made as to whether the congestion bit has been set to congested. When the congestion bit is set, the process transitions to block 655, at which point a link OK message is sent to all hosts. This message informs the other nodes on the network that the link may be used again. At this point in time, the link is no longer congested and may accept new flows. Stepping to block 660, the congestion bit is set to indicate that the node is not congested. Moving to block 665, the timer is set. The process is repeated according to a timed period. The process advances to an end block and returns to processing other actions.

FIG. 7 illustrates a simple admission control utilizing a dedicated network element, in accordance with aspects of the present invention. After a start block, the process moves to block 710, at which point link load information is received from a node on the network. Moving to block 720, the path information is updated in response to the received link load. Transitioning to block 730, load information may be sent to the node. The load information may contain many different types of data. The load information may contain the link loads for each node within the network. The load information may also include routing rules for the nodes.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method comprising:
   determining when a flow arrives;
   for each of a plurality of links within a path for the flow, receiving a message indicating whether or not the link is congested;
   determining from the plurality of received messages whether or not the path is congested; and
   accepting the flow if the path is determined not to be congested, wherein accepting the flow comprises one of sending a packet over one of the plurality of links that was received on another of the plurality of links or sending a bandwidth broker message to each node through which one of the plurality of links passes, where the bandwidth broker message comprises one of link loads for the plurality of links or configuration rules for the flow.

2. The method of claim 1, wherein determining whether or not the path is congested further comprises receiving in each message a link load, and comparing each received link load to a predetermined threshold to determine whether or not the path is congested.

3. The method of claim 1, wherein the network comprises a radio access network.

4. The method of claim 1, wherein each of the messages indicating whether or not the link is congested is received:
   upon at least one of the conditions: a change to a congestion status of the link; and expiration of a timer.

5. The method of claim 1, wherein each of the messages indicate congestion by a link load that is represented by an exponential averaging equation.

6. The method of claim 1, executed by a bandwidth broker.

7. The method of claim 5, wherein the exponential averaging equation is:

$$\text{link load} = (1-w) * \text{link load}_{i-1} + w * (8 * \text{bytes per period}_i / (p * \text{link capacity})),$$

wherein link capacity is bits per second, w is a weighting parameter and p is a measurement period parameter over a time period for which the load is measured.

8. The method of claim 1, wherein determining from the received plurality of messages whether the at least one path is congested comprises reading from each received message a congestion bit indicating the link is congested or not congested.

9. The method of claim 1, wherein a new message is received for each link no more frequently than when that link changes between congested and not congested, and expiration of a timer kept by a node through which that link passes.

10. The method of claim 1, wherein determining when a flow arrives further comprises determining a service class of the flow; and further wherein determining whether or not the path is congested is specific for the service class.

11. The method of claim 1, wherein there are a plurality of paths for the flow, wherein a message is received from each link within each of the plurality of paths indicating whether or not the link is congested and determining whether or not the path is congested is for each of the plurality of paths, and wherein accepting the flow comprises choosing a least congested path from among the plurality of paths.

12. A computer readable storage medium storing computer executable instructions when executed by a computer perform the following:

for each of a plurality of links within a path through a network, receiving a message from a node through which the link passes that indicates whether or not the link is congested; determining from the plurality of messages whether or not the path is congested; and accepting a new flow that is satisfied by the path if the at path is determined not to be congested, wherein accepting the new flow comprises one of sending over one of the plurality of links a packet that was received on another of the plurality of links or sending a bandwidth broker message to each of the nodes through which one of the plurality of links passes, where the bandwidth broker message comprises one of link loads for the plurality of links or configuration rules for the new flow.

13. The computer-readable storage medium of claim 12, wherein determining from the plurality of messages whether or not path is congested further comprises receiving in each message a link load, and comparing the link load to a predetermined threshold.

14. The computer-readable storage medium of claim 12, wherein determining from the plurality of messages whether or not the path is congested further comprises calculating a link load from each of the messages.

15. The computer-readable storage medium of claim 14, wherein the link load is computed as:

$$\text{link load}_i = (1-w) * \text{link load}_{i-1} + w * (8 * \text{bytes per period}_i / (p * \text{link capacity})),$$

wherein link capacity is bits per second, w is a weighting parameter and p is a measurement period parameter over a time period for which the load is measured.

16. The computer-readable storage medium of claim 12, wherein the network comprises a radio access network.

17. The computer-readable storage medium of claim 12, wherein the computer readable storage medium and processor are disposed in a bandwidth broker.

18. The computer-readable storage medium of claim 12, wherein the instructions further comprise determining a service class of the new flow; and further wherein determining whether or not the at least one path is congested is specific for the service class.

19. The computer-readable storage medium of claim 12, wherein the instructions operate for a plurality of paths through the network and each link is within at least one of the plurality of paths, and wherein accepting the flow comprises choosing a path from among the plurality of paths based on a parameter selected from the group: least congested; number of hops; and shortest distance.

20. A system comprising:

nodes arranged along an available path through an internet protocol based network, each node comprising a network interface unit arranged to communicate across the network a message indicating whether or not a link through the node is congested or not congested; and a bandwidth broker that is configured to process information relating to each of the messages received from the nodes, wherein the bandwidth broker comprises:

a network interface unit arranged to communicate with the nodes; a processor; and an admission control program embodied on a computer-readable storage medium executing under the control of an operating system and operative to perform actions, including:

receiving from each of the nodes the congested or the not-congested message; and for a new flow between a source and destination coupled by the available path, accepting the new flow if the message from each node along the available path is a not-congested message, wherein accepting the new flow comprises sending from the network interface unit a bandwidth broker message to each of the nodes, where the bandwidth broker message comprises one of link loads for the nodes or configuration rules for the new flow.

21. The system of claim 20, wherein the internet protocol-based network comprises a radio access network.

22. The system of claim 20, wherein each node further comprises a processor configured to calculate a link load, and wherein the message is based on a comparison of the link load to a threshold.

23. The system of claim 22, wherein the link load is calculated according to:

$$\text{link load}_i = (1-w) * \text{link load}_{i-1} + w * (8 * \text{bytes per period}_i / (p * \text{link capacity})),$$

where w is a weighting parameter and p is a measurement period parameter over a time period for which the load is measured.

24. The system of claim 20, wherein the instructions further comprise:

calculating at the bandwidth broker a link load from each of the received messages.

25. An apparatus comprising:

means for determining when a flow arrives;

means for determining, from a plurality of messages, each message received from a node associated with a link within an available path for the flow, whether the available path is congested; and means for accepting the flow when the available path is determined not to be congested, wherein accepting the flow comprises one of sending from a sending means over one of the links a packet that was received on another of the links or sending a bandwidth broker message to each of the nodes, where the bandwidth broker message comprises one of link loads for the links or configuration rules for the new flow.

26. The apparatus of claim 25, wherein:

the means for determining when a flow arrives comprises a processor coupled to a network interface unit;

the means for determining whether the available path is congested and the means for accepting the flow comprises the processor; and the sending means comprises the network interface unit.

27. An apparatus comprising:

a processor and a network interface that are configured to determine when a flow arrives;

the processor configured to determine from a plurality of messages, each message received from a node associated with a link within an available path for the flow, whether the available path is congested; and the network interface configured to accept the flow when the available path is determined not to be congested by one of sending over one of the links a packet that was received on another of the links or sending a bandwidth broker message to each of the nodes, where the bandwidth broker message comprises one of link loads for the links or configuration rules for the new flow.

28. The apparatus of claim 27 comprising a bandwidth broker.

29. The apparatus of claim 27, wherein each of the plurality of messages comprises a link load, and the processor is configured to determine whether the available path is congested by comparing the link load of each of the plurality of messages to a 30. The apparatus of claim 29, wherein the link load is represented by an exponential averaging equation.

31. The apparatus of claim 30, wherein the exponential averaging equation is:

$$\text{link load}_i = (1-w)*\text{link load}_{l-1} + w*(8*\text{bytes per period}_i/(p*\text{link capacity})),$$

wherein link capacity is bits per second, w is a weighting parameter and p is a measurement period parameter over a time period for which the load is measured.

* * * * *

UNITED STATES PATENT AND TRADEMARK OFFICE
CERTIFICATE OF CORRECTION

PATENT NO. : 7,489,632 B2
APPLICATION NO. : 10/105067
DATED : February 10, 2009
INVENTOR(S) : Lakkakorpi It is certified that error appears in the above-identified patent and that said Letters Patent is hereby corrected as shown below:

Claim 7, column 9, lines 1-2 please delete the equation and replace with
-- link $load_i$ = (1 - w)*link $load_{i-1}$ + w*(8*bytes per $period_i$/(p*link capacity)), --.

Claim 12, column 9, line 34, please delete "at".

Claim 29, column 12, line 9, after "a" please insert -- predetermined threshold to determine whether the available path is congested --.

Signed and Sealed this

Fifth Day of May, 2009

JOHN DOLL
*Acting Director of the United States Patent and Trademark Office*